United States Patent [19]

Roberts

[11] 3,862,579

[45] Jan. 28, 1975

[54] PEDAL MECHANISM

[76] Inventor: Howard Rudy Roberts, Box 895, Hope, British Columbia, Canada

[22] Filed: Nov. 5, 1973

[21] Appl. No.: 412,954

[52] U.S. Cl. ................ 74/89.2, 74/217 B, 280/251
[51] Int. Cl. ..... F16h 7/00, B62m 11/00, B62m 1/08
[58] Field of Search ........ 74/217 B, 25, 89.2, 89.21, 74/216.5; 280/251, 243, 252, 258

[56] References Cited
UNITED STATES PATENTS

| 398,455 | 2/1889 | Schubert | 280/251 |
| 444,620 | 1/1891 | Rouveyre | 280/251 |
| 3,039,790 | 6/1962 | Trott | 280/251 |
| 3,375,023 | 3/1968 | Cox | 280/251 |

FOREIGN PATENTS OR APPLICATIONS

| 438,953 | 6/1912 | France | 280/251 |

Primary Examiner—Benjamin W. Wyche
Assistant Examiner—Allan R. Burke
Attorney, Agent, or Firm—Carver and Company

[57] ABSTRACT

Pedal mechanism in which effective moment arm of force applied to pedals is constant throughout power strokes, thus increasing effectiveness of pedal mechanism. Pedal mechanism has pair of spaced drive pulleys journalled for rotation about aligned axes, and pair of spaced arms having respective pedals, inner ends of arms journalled for rotation. Anchoring means provided adjacent outer ends of arms describe strokes when arms rotate, strokes being within planes coplanar with drive pulleys. First idler positioned adjacent the driving members at inner ends of strokes and second idler positioned at outer ends of strokes. Drive belt extends from left hand anchoring means, passes around left hand drive pulley to first idler, thence around right hand drive pulley to right hand anchoring means, thence around second idler to left hand anchoring means. This forms loop of belt coupling both anchoring means and wrapped around both driving members. Swinging alternate arms through power strokes drive appropriate drive pulley in forward direction. Power shaft journalling drive pulleys freely at ends of shaft has ratchet means coupling shaft and drive pulleys, so that alternate rotation of each drive pulley produces continuous rotation of drive shaft.

10 Claims, 7 Drawing Figures

PATENTED JAN 28 1975
3,862,579
SHEET 1 OF 2
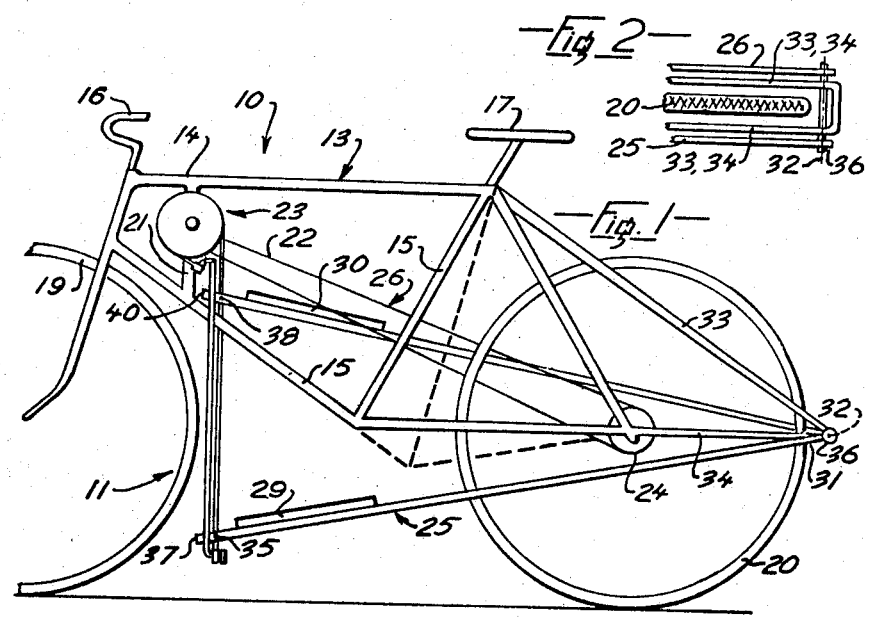
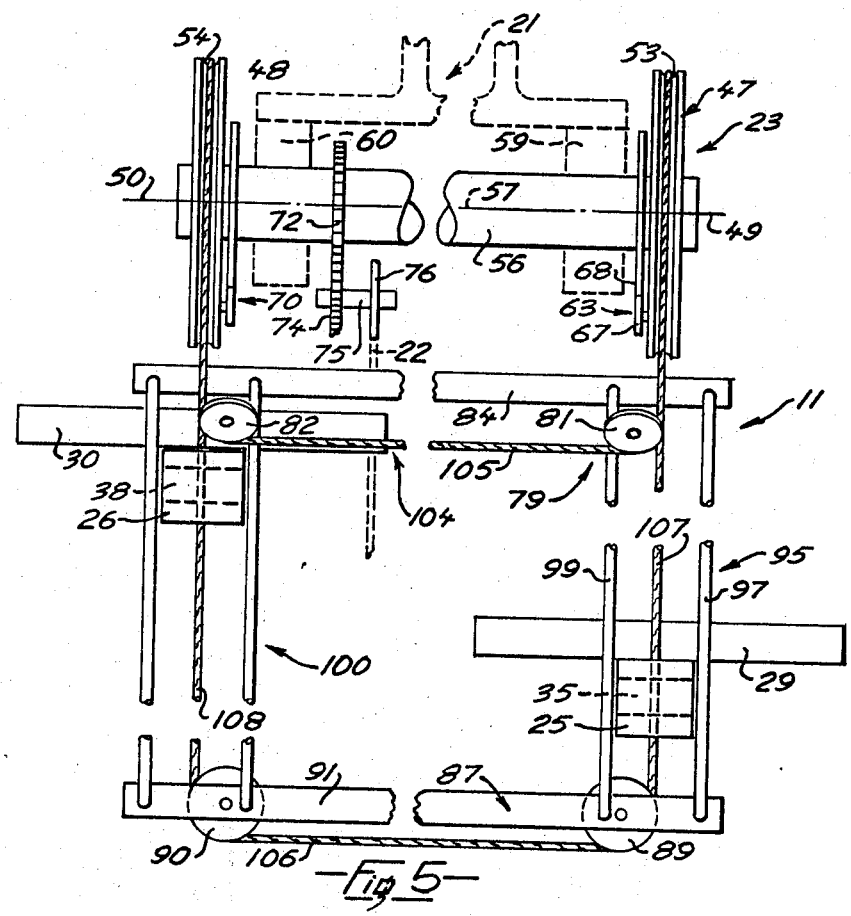

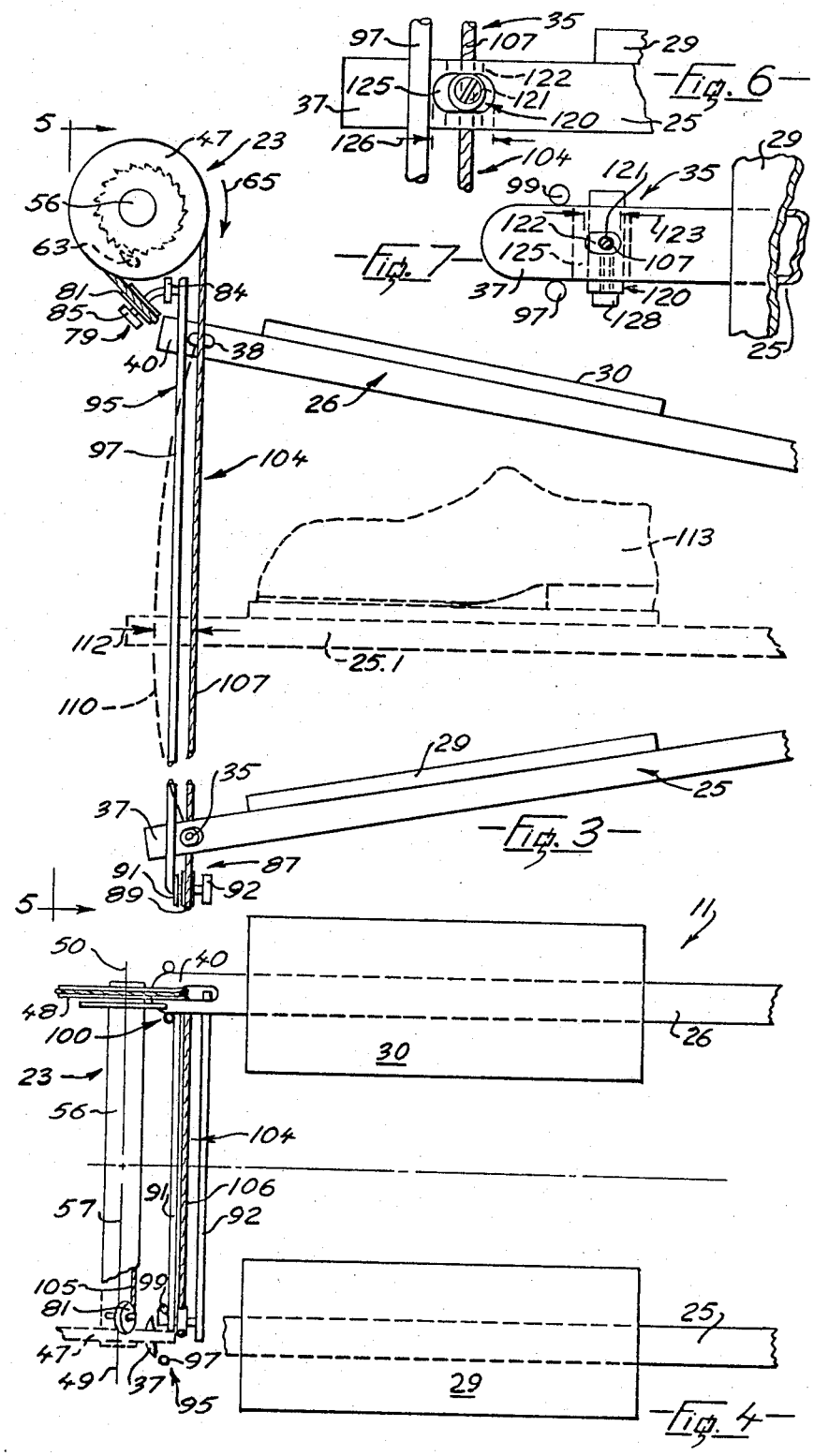

PEDAL MECHANISM

BACKGROUND OF THE INVENTION

1. Field of the Invention

The invention relates to a pedal mechanism particularly adapted for, but not limited to, use on a pedal bicycle.

2. Prior Art

The common bicycle pedal mechanism has been used for many years with little major change. In one complete revolution of a pedal crank of the common mechanism, a relatively small fraction of the complete revolution is useful for power purposes, a typical useful fraction being about 90° of a downward stroke between an uppermost and a lowermost position. When toe-clips are fitted to the pedals, thus permitting an upward pull on the pedals, the useful fraction of the revolution of the pedal is increased, however a relatively large fraction of the revolution that is useless for power purposes remains. If force application during the useful fraction is analysed, it is found that force applied to the pedals is mostly at an effective moment arm considerably less than pedal crank length, thus resulting in relatively poor torque output from the pedal mechanism.

SUMMARY OF THE INVENTION

The invention reduces difficulties of the prior art by providing a pedal mechanism in which effective moment arm of force applied to pedals is constant throughout the power stroke, and thus effectively 180° of revolution of a driving member can utilize to a full extent application of force applied to the pedals. The circular motion of the pedals is eliminated and an effectively straight line motion of the pedals has been substituted, thus simplifying action of an operator.

A pedal mechanism according to the invention converts reciprocating motion of a pair of pedals to rotary motion of a power shaft. The mechanism includes left-hand and right-hand spaced circular driving members journalled for rotation about aligned driving member axes fixed relative to a frame, the members having peripheral engaging means disposed in spaced parallel diametrical planes. The mechanism also includes left-hand and right-hand arms, each arm having a respective pedal and a respective inner end journalled for limited rotation relative to the frame about an arm axis disposed parallel to the driving member axis. An anchoring means is fitted adjacent an outer end of each arm, each anchoring means passing through a stroke when the particular arm swings through an arc centered on the arm axis. The strokes of the anchoring means of the left-hand and right-hand arms are within planes coplanar with the diametrical planes of the left-hand and right-hand driving members respectively. The strokes of the anchoring means have inner and outer ends, the driving member being positioned adjacent the inner end of the respective stroke.

The mechanism further includes first and second idler means journalled for rotation within planes normal to the diametrical planes of the driving members. Each idler means has transversely disposed peripheral engaging means, respective portions of which means are tangentially aligned with the peripheral engaging means of the right-hand and left-hand driving members. The first and second idler means are positioned adjacent the inner and outer ends of the strokes of the anchoring means respectively.

A flexible tension link cooperates with the left-hand anchoring means and passes around the left-hand driving member to the first idler means. The link then passes around the right-hand driving member to the right-hand anchoring means thence around the second idler means to return to the left-hand anchoring means, thus forming a loop of link coupling both anchoring means and wrapped around both driving members. The idler means are positioned to ensure adequate link wrap around the driving members. Thus when the right-hand arm swings through an arc so that the right-hand anchoring means moves from the inner end to the outer end of the stroke to produce a power stroke of the right hand portion of the link, a tangential force is applied to the right-hand driving member from the link to rotate the driving member in a forward direction. simultaneously the left-hand driving member rotates in a backward direction in response to movement of a left-hand portion of the link, the left-hand anchoring means moving through a return stroke to move the left-hand arm towards the left-hand pulley.

The mechanism includes a power shaft journalled for rotation about a power shaft axis, the power shaft axis being fixed relative to the frame and aligned with the driving member axes. Ratchet means cooperate with each respective driving member and the power shaft so that alternate rotation in the forward direction of each driving member resulting from consecutive power strokes of each arm produces an essentially continuous rotation of the power shaft in the forward direction, the ratchet means permitting rotation in a backward direction of a driving member prior to a power stroke thereof.

A detail disclosure following, related to drawings, describes a preferred embodiment of the invention which however is capable of expression in structure other than that particularly described and illustrated.

DESCRIPTION OF THE DRAWINGS

FIG. 1 is a fragmented side elevation of a bicycle frame equipped with a pedal mechanism according to the invention, some portions being omitted, FIG. 2 is a fragmented top plan of a rear portion of the bicycle frame of FIG. 1, FIG. 3 is a fragmented side elevation of a forward portion of the pedal mechanism, FIG. 4 is a fragmented top plan of the forward portion of the pedal mechanism of FIG. 3, some portions being removed, FIG. 5 is a fragmented simplified front elevation of the pedal mechanism as seen from 5—5 FIG. 3, the mechanism being at an enlarged scale, with some portions being removed, FIG. 6 is a fragmented detail of an anchoring means adjacent an outer end of an arm, components being spaced apart for clarity, FIG. 7 is a fragmented detail top plan of the anchoring means of FIG. 6.

DETAIL DISCLOSURE

FIGS. 1 and 2

A bicycle 10 is shown fitted with a pedal mechanism 11 according to the invention. The bicycle has a frame 13 having a cross bar 14, a down tube 15, handlebars 16, a saddle 17 and front and rear wheels 19 and 20. Portions of a conventional bicycle frame which are eliminated are shown in undesignated broken lines.

The rear wheel 20 is driven by a chain 22 extending from an output portion 23 of the pedal mechanism 11 to a sprocket 24 on the wheel 20. The portion 23 is mounted on a support 21 extending between the crossbar 14 and down tube 15.

The pedal mechanism has left-hand and right-hand arms 25 and 26, each arm having a respective pedal 29 and 30, the pedals being positioned on the arms to receive feet of a rider (not shown) sitting on the saddle 17. The arm 25 has an inner end 31 journalled for rotation relative to the frame about an arm spindle 36 having an axis 32 and being disposed rearwardly of a rearmost portion of the rear wheel and at a position approximately level with the axle of the wheel. The spindle 36 is supported by upper and lower rear stays 33 and 34 extending rearwards as shown. The arm 25 has an outer end 37 and a left-hand anchoring means 35 cooperating with the outer end 37 to be described. The arm 26 similarly has an inner end journalled to rotate about the axis 32, an outer end 40, and an anchoring means 38 similarly cooperating with the outer end 40. Each anchoring means describes a respective stroke when the particular arm swings about the arm axis 32, as will be described with reference to FIGS. 3 and 4.

FIGS. 3 through 5

The output portion 23 of the pedal mechanism has left-hand and right-hand spaced drive pulleys 47 and 48, the pulleys being journalled for rotation about aligned drive pulley axes 49 and 50 respectively. The axes 49 and 50 are parallel to the arm axis 32 of FIG. 2. The pulleys have peripheral grooves 53 and 54 respectively disposed in spaced parallel diametrical planes, the pulleys being journalled for rotation relative to, and at outer ends of, a power shaft 56. The shaft 56 is journalled for rotation about a power shaft axis 57, being carried in bearings 59 and 60 secured to the support 21, portions of which bearings are shown in broken outline. The power shaft axis is thus fixed relative to the frame and is aligned with the drive pulley axes. A ratchet means 63 cooperates with the drive pulley 47 and the power shaft so that rotation of the pulley 47 in the direction shown by an arrow 65 (FIG. 3) hereinafter forward direction, rotates the power shaft 56 about the axis 57. The ratchet means is a pawl 67 secured to the pulley 47 engaging a ratchet wheel 68 secured to the shaft 56. Clearly, if desired other types of unidirectional clutch can be substituted. The pulley 48 has a similar right hand ratchet means 70 cooperating with the power shaft 56 and is similarly adapted for rotation in the same forward direction as the arrow 65, as viewed in FIG. 3, the pulley 48 and ratchet means 70 not being shown in FIG. 3. Thus, when either drive pulley is rotated in the forward direction, the shaft 56 rotates in a forward direction, and when either pulley rotates in a backward direction the shaft 56 remains stationary. A power take-off pinion 72 meshes with a gear wheel 74 secured to a shaft 75 carrying a sprocket 76. The chain 22 passes around the sprocket 76 and thus power is transmitted to the sprocket 24 on the rear wheel axle at an appropriate ratio dependent on relative sizes of the sprockets 76 and 24, and pinion 72 and gear wheel 74. Bearings for the shaft 75 are not shown.

A first idler means 79 has a pair of spaced coplanar pulleys 81 and 82, the pulleys being journalled for rotation about spindles having parallel axes and secured to transverse supports 84 and 85 secured to the frame 13 by brackets (not shown). Both pulleys have peripheral grooves, and an outer portion of the groove of each idler pulley is tangentially aligned with a respective portion of a particular drive pulley, as seen in FIG. 5. Hereinafter and in the claims, the term "tangentially aligned" refers to an alignment condition of the peripheral grooves of two pulleys spaced in mutually perpendicular planes. In such a condition, a drive belt passing off one pulley is fed smoothly on to the other pulley, with no tendency of the belt to run out of either groove. The first idler means is positioned adjacent an inner end of the stroke of the anchoring means, the inner end being adjacent the drive pulleys as shown.

A second idler means 87 has a similar pair of spaced pulleys 89 and 90 similarly journalled for rotation about parallel spindles having axes and being secured to transverse supports 91 and 92 secured to guide means as will be described. Each pulley has a similar peripheral groove, a portion of which is similarly tangentially aligned with a similar portion of the drive pulleys 47 and 48, as best seen in FIG. 5. As seen in FIG. 3, each idler means is journalled for rotation within planes normal to the diametrical planes of the drive pulleys.

A guide means 95 relating to the left-hand arm 25 extends from a position adjacent the drive pulley 47 i.e., at an inner end of a stroke of the anchoring means 35, to the second idler means 87 at an outer end of the stroke. The guide means include a pair of spaced parallel rods 97 and 99 having inner and outer ends, the inner ends being secured to the transverse support 84 and the outer ends being secured to the transverse support 91. The rods 97 and 99 are spaced sufficiently to accept and permit free sliding of the outer end 37 of the arm 25 therebetween, the rods serving as guides to permit limited swinging of the arm 25 through the arc, whilst restricting lateral movement of the arm. Right-hand guide means 100 similarly cooperate with the outer end 40 of the arm 26. As can be seen in FIG. 5, the strokes of the anchoring means of the left-hand and right-hand arms are within planes coplanar with the diametrical planes of the left-hand and right-hand drive pulleys respectively.

A drive belt 104 cooperates with the left-hand anchoring means 35 and passes around the left-hand drive pulley 47, around the first idler means 79, thence around the right-hand drive pulley 48, to the right-hand anchoring means 38. The belt continues around the second idler means 87 thence to the left-hand anchoring means 35 to form a loop of drive belt coupling both anchoring means and wrapping around both driving pulleys, as best seen in FIG. 5. For the positions of the arms as shown, in which the left-hand pedal is at a low extreme position, the drive belt 104 has an upper run 105 extending between the idler pulleys 81 and 82 of the first idler means 79, a lower run 106 extending between the idler pulleys 89 and 90 of the second idler means 87, and left-hand and right-hand runs 107 and 108 respectively extending between respective drive pulleys and the second idler means. The link 104 is pretensioned before fitting around the pulleys to maintain adequate tension in the link to reduce chances of slippage relative to the drive pulleys.

Each anchoring means is adapted to accommodate arcuate movement of the outer end of the particular arm as the arm swings through an arc centred on the arm axis, the arc for a portion of the arm cooperating with the anchoring means being shown as a broken line 110 in FIG. 3. The left-hand and right-hand runs of the drive belt are disposed on a chord connecting the inner most and outer most positions of the anchoring means that is positions adjacent the first and second idler means.

The arc 110 is spaced a maximum chord separation 112 from the chord at a mid-position of the stroke, in which the arm is shown in broken outline at 25.1 bearing a foot 113 of the operator. For an arm of about 40 inches and a stroke of about 14 inches, the maximum chord separation 112 is about three-quarters of an inch. The anchoring means is adapted to accommodate such a maximum separation, by means to be described with reference to FIGS. 6 and 7.

FIGS. 6 and 7

The anchoring means 35 includes a stop 120 secured to the left-hand run 107 of the drive belt 104 adjacent the outer end 37 of the arm 25. The stop is a cylindrical member extending transversely of the belt and disposed in a plane parallel to the arm axis 36, FIG. 2. The stop has a transverse bore 121 to accept a portion of the belt 104 and is secured to the link as will be described. The outer end 37 of the arm has a first opening or elongated slot 122 to accept the belt, the first slot being within a plane containing a portion of the belt adjacent the stop. The slot 122 has a length 123 sufficient to accommodate relative longitudinal movement of the belt resulting from the maximum separation 112 (see FIG. 3) and has a width sufficient to permit easy sliding of the belt. The outer end 37 has a second opening or elongated slot 125, being generally horizontal and disposed in a plane normal to the link and intersecting the first slot, the second slot having a width to accommodate the stop 120 extending freely therethrough as shown. The second slot has a length 126 to accommodate relative longitudinal movement of the stop as the anchoring means describes the stroke. The stop 120 slides from an outer end of the slot to an inner end of the slot and back to the outer end of the slot as the arm describes an arc. Thus force applied to the arm is transferred to the belt through the stop. The relative position of the stop on the link is adjustable by means of a screw 128 which engages the belt 104 as it passes through the stop and secures the stop to the belt.

OPERATION

The operator places one foot on each pedal and, starting at the position of the pedals shown in FIG. 3, presses on the right hand pedal so that the right hand arm 26 swings through an arc causing the anchoring means 38 to move from the inner end to the outer end of a stroke. This produces a power stroke acting on the right hand drive pulley 48, rotating the drive pulley in a forward direction, the left-hand drive pulley rotating in a backward direction in response to upward movement of the left-hand portion 107 of the link. The upward movement of the portion 107 moves the means 35 upward through a return stroke, thus moving the left-hand arm upwards toward the left-hand drive pulley 47. The right-hand ratchet means 70 drives the drive shaft 56 in the forward direction, the left-hand ratchet means simultaneously free-wheeling permitting backward rotation of the drive pulley 47. The left-hand pedal 29 is now pushed down producing a further power stroke, the left-hand ratchet means driving the drive shaft, and the right-hand ratchet means slipping. Thus alternate rotation in the forward direction of each drive pulley, resulting from consecutive power strokes of each arm, produces essentially continuous rotation of the power shaft in the forward direction. The ratchet means simultaneously permits rotation in a backward direction of a particular drive pulley prior to the power stroke of that particular drive pulley.

ALTERNATIVES AND EQUIVALENTS

The pedal mechanism is shown having a drive belt 104 in engagement with drive pulleys 47 and 48 and idler pulleys. Clearly a chain could be substituted, sprockets being substituted for the drive pulleys and idler sprockets being substituted for the idler pulleys. In such an arrangement, the sprockets would have peripheral teeth to engage the chain, which teeth are equivalent to the peripheral grooves of the pulleys. In the claims, the term "circular driving member" refers to both pulleys and sprockets, the term "peripheral engaging means" refers to both pulley grooves and sprocket teeth, and the term "flexible tension link" refers to both drive belts and chains. Such an alternative tension link is not shown, but if a chain were substituted provision would be incorporated in the chain to accommodate a change of 90° in direction of engagement of the chain with the sprockets as the chain passes from the drive sprockets to the idler sprockets and vice versa. Swivel means or equivalents can be provided in the chain.

The guide means 95 are shown to be a pair of spaced rods 97 and 99 cooperating with outer ends of the arms. Other types of guide means can be provided, for example a single rod engaging a slot in outer ends of the arm. This alternative also is not shown. The anchoring means are shown to have limited relative movement to accommodate arcuate movement of the ends of the arms. Such movement is relatively small, and if length of the arms were increased, the stop could be secured directly to the arm and stretch in the drive belt could accommodate reduced arcuate movement.

I claim:

1. A pedal mechanism for converting reciprocating motion of pedals to rotary motion of a power shaft, the mechanism including:
    i. left-hand and right-hand spaced circular driving members journalled for rotation about aligned driving member axes fixed relative to a frame, the members having peripheral engaging means disposed in spaced parallel diametrical planes,
    ii. left-hand and right-hand arms, each arm having: a respective pedal; a respective outer end; a respective inner end journalled for rotation relative to the frame about an arm axis disposed parallel to the driving member axes; and a respective anchoring means adjacent the respective outer end thereof, each anchoring means describing a stroke when the particular arm swings through an arc centred on the arm axis; the strokes of the anchoring means of the left-hand and right-hand arms being within planes coplanar with the diametrical planes of the left-hand and right-hand circular driving members respectively, the strokes of the anchoring means having inner and outer ends, the driving members being positioned adjacent the inner ends of the respective strokes,
    iii. first and second idler means journalled for rotation within planes normal to the diametrical planes of the circular driving members, each idler means having transversely disposed peripheral engaging means, portions of which are tangentially aligned with the peripheral engaging means of the right-hand and left-hand driving members respectively, the first idler means being positioned adjacent an inner end of the stroke of the anchoring means and the second idler means being positioned adjacent an outer end of the stroke of the anchoring means, the idler means being positioned relative to each other to ensure adequate link wrap around the driving members so as to eliminate slippage between a link and the driving member, iv. a flexible tension link cooperating with the left-hand anchoring means and passing around the left-hand driving member to the first idler means; thence around the right-hand driving member to the right-hand anchoring means; thence around the second idler means to the left-hand anchoring means so as to form a loop of link coupling both anchoring means and wrapped around both driving members, so that when the right hand arm swings through an arc so that the right hand anchoring means moves from the inner end to the outer end of the stroke to produce a power stroke of a right hand portion of the link, tangential force is applied to the right hand driving member from the link to rotate that driving member in a forward direction, the left-hand driving member rotating in a backward direction in response to movement of a left-hand portion of the link, which movement causes the left-hand anchoring means to move through a return stroke, thus swinging the left hand arm through an arc towards the left-hand driving member, v. a power shaft journalled for rotation about a power shaft axis, the power shaft axis being fixed relative to the frame and aligned with the driving member axes, vi. ratchet means cooperating with each respective driving member and the power shaft so that alternate rotation in the forward direction of each driving member resulting from consecutive power strokes of each arm produces essentially continuous rotation of the power shaft in the forward direction, the ratchet means permitting rotation in a backward direction of a driving member prior to a power stroke.

2. A pedal mechanism as claimed in claim 1 further characterised by:
i. guide means relating to each arm extending from positions adjacent inner ends of respective strokes to positions adjacent outer ends of respective strokes,
ii. the outer end of each arm cooperating with a respective guide means, the guide means permitting limited swinging of the arm through the arcs and restricting lateral movement of the arm.

3. A pedal mechanism as claimed in claim 2 in which:
i. first and second transverse support means are secured to the frame at positions adjacent the first and second idler means and are adapted to journal the first and second idler means,
ii. the guide means have inner and outer ends secured to the first and second transverse support means respectively, 4. A pedal mechanism as claimed in claim 3 in which:

i. the guide means include a pair of spaced parallel rods having inner and outer ends secured to the first and second transverse supports respectively,
ii. the outer ends of each arm are accepted between the parallel rods so as to permit free sliding of the arm between the rods, with restricted lateral movement relative to the rods.

5. A pedal mechanism as claimed in claim 1 in which:
i. left-hand and right-hand circular driving members are drive pulleys, each pulley having a peripheral groove serving as a peripheral engaging means,
ii. the first and second idler means are idler pulleys having peripheral grooves and being journalled for rotation on the transverse supports, portions of the peripheral grooves being tangentially aligned with portions of respective grooves of the drive pulleys,
iii. the flexible tension means is a drive belt having sufficient friction when engaged with the drive pulley to resist slippage relative to the drive pulley.

6. A pedal mechanism as claimed in claim 1 in which the circular drive members are journalled for rotation on outer ends of the power shaft.

7. A pedal mechanism as claimed in claim 5 in which each idler means has a pair of spaced coplanar pulleys journalled for rotation about parallel spindles extending between portions of the transverse support means, an outer portion of the peripheral groove of each idler pulley being tangentially aligned with a respective portion of the groove of the respective drive pulley.

8. A pedal mechanism as claimed in claim 1 in which each anchoring means includes:
i. a stop secured to the link at a position adjacent the outer end of an arm,
ii. the outer end of the arm has a first opening to accept the link, the first opening providing clearance for the link,
iii. the outer end of the arm has a second opening to accept the stop, so that a force acting on the arm is transferred through the stop to the link.

9. A pedal mechanism as claimed in claim 8 in which:
i. the stop is a cylindrical member extending transversely from the link and disposed in parallel relationship to the arm axis, the stop having a transverse bore to accept the link,
ii. the first opening is an elongated first slot disposed within a plane containing a portion of the link adjacent the stop, the slot having sufficient length to accommodate relative longitudinal movement of the link as the anchoring means passes through a stroke,
iii. the second opening is an elongated second slot disposed in a plane normal to the plane of the link and intersecting the first slot, the second slot having a width to accommodate the stop extending freely therethrough, and a length sufficient to accommodate relative longitudinal movement of the stop as the anchoring means passes through a stroke.

10. A pedal mechanism as claimed in claim 1 in which the pedal mechanism is adapted to power a bicycle having front and rear wheels, and a bicycle frame including a cross bar and a down tube and in which:
i. the drive pulleys are journalled in a support extending between the cross bar and the down tube,
ii. the arm axis is disposed rearwardly of a rearmost portion of the rear wheel and at a position approximately level with the rear wheel axle, thus providing relatively long arms to result in a relatively flat arc described by the anchoring means during a stroke.

* * * * *